(No Model.)
H. W. HUTCHINS.
MACHINE FOR SAWING, GROOVING, &c.
No. 541,167. Patented June 18, 1895.
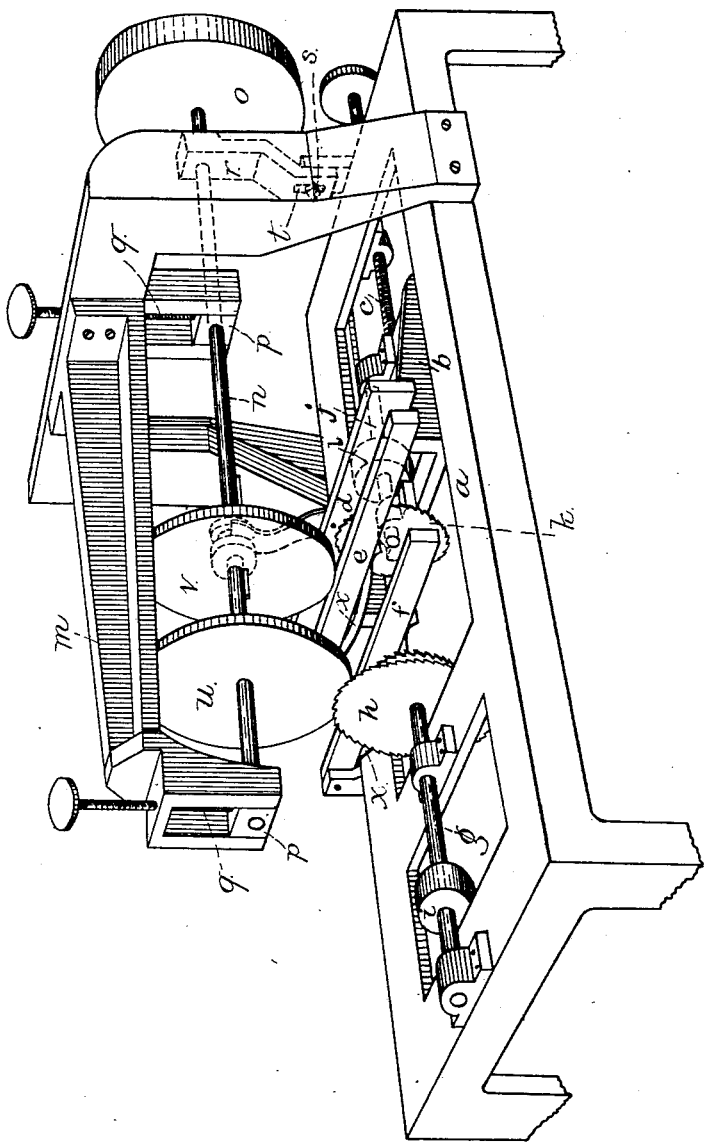
Witnesses:
Jennie E. Pollard.
M. H. dedman
Inventor:
Harrison W. Hutchins
by
Vanill and Clifford
his attorneys.
THE NORRIS PETERS CO., PHOTO-LITHO., WASHINGTON, D. C.

UNITED STATES PATENT OFFICE.

HARRISON W. HUTCHINS, OF AUBURN, MAINE.

MACHINE FOR SAWING, GROOVING, &c.

SPECIFICATION forming part of Letters Patent No. 541,167, dated June 18, 1895.

Application filed March 7, 1895. Serial No. 540,810. (No model.)

*To all whom it may concern:*

Be it known that I, HARRISON WESLEY HUTCHINS, a citizen of the United States of America, residing at Auburn, in the county of Androscoggin and State of Maine, have invented certain new and useful Improvements in Machines for Sawing, Grooving, Rabbeting, &c.; and I do hereby declare the following to be a full, clear, and exact description of the invention, such as will enable others skilled in the art to which it appertains to make and use the same.

My invention relates to improvements in machines for grooving, rabbetting, &c., and particularly to a tension and feeding device for the same.

It consists in a suitable frame work, a yielding feed table, feed rolls in combination with said yielding table and suitable rotary tools disposed in such manner as to saw, groove, plane, &c., in the direction of the moving work.

It consists further in certain details of construction which will be hereinafter described and specifically claimed.

It is designed to render the working of the material easy for the workman and obviate danger from getting in contact with the rotary tools.

In the drawing herewith accompanying and making a part of this application the figure is a perspective view of my improved machine.

In said drawing $a$ represents the frame. Mounted in the frame is a movable carriage $b$ adapted to be moved or adjusted longitudinally in said frame by means of a feed screw $c$. Rigidly mounted on said carriage is a guide plate $d$ and pivotally attached to said carriage is one arm $e$ of a yielding feed table. Pivotally attached to the machine frame is the other arm $f$ of the yielding feed table. Mounted on an arbor $g$ is a cutting off saw $h$, said saw being operated by a belt passing over pulley $i$ mounted on said arbor. Also carried by said arbor is a tool for grooving, rabbeting, &c. Mounted on an arbor $j$ is a corresponding grooving or rabbeting saw $k$, said saw being operated by a pulley $l$ mounted on said arbor $j$ and adapted to move with the carriage, so as to be adjustable to make the groove, tongue, &c., at variable distances. Attached to the frame is a suitable supporting arm $m$ extending parallel with and above the frame, and mounted therein is a shaft $n$ operated by a pulley $o$, said shaft being mounted in adjustable bearings $p$, which bearings are adapted to be adjusted vertically by means of adjusting screws $q$. The pulley end of said shaft is supported in a bearing $r$ attached to the frame and adjustable thereon by means of a set screw $s$ passing through a slot $t$ in said bearing. Mounted on said shaft $n$ are feed rolls $u$ and $v$ so arranged as to be directly over the yielding arms or levers which constitute the work table. The feed roll $v$ is splined on said shaft and is adjustable by means of a shipper $w$ attached to said carriage.

All the working tools, whether designed to groove, tongue, plane, saw or rabbet, are rotary and rotate or cut in the direction of the moving work. The yielding arms which form the table are supported by springs $x$ to enable them to accommodate themselves to any variation in the thickness of the work. The work is laid upon said arms against the guide plate and moved forward until it comes in contact with the feed rolls, whence they are taken by said rolls and moved forward over the rotary tools. The tools cutting in the direction of the moving work, tend to move the work forward, and the rate of movement is regulated by the feed rolls.

It will be evident that when the work is brought in contact with the work tools, they will be fed forward by the machinery and will not require to be held upon the tools by hand, thus making the work very much lighter for the operator and lessening the danger of injury from the work tools, which is incident to holding the work loosely against the tools by the operator.

I claim—

1. In a machine for sawing, grooving, rabbeting, &c., the combination with a suitable supporting frame, a carriage longitudinally adjustable therein, a guide plate, a rotary tool and one section of a spring supported work table mounted on said carriage, of one or more rotary tools mounted in said frame, said tools rotating in the same direction as the feed rolls, a section of the spring supported work table pivotally attached to the frame, feed rolls mounted above said tables and means for operating said carriage, tools and feed rolls, substantially as set forth.

2. In a machine for sawing, grooving, rabbeting, &c., the combination with a supporting frame, a carriage longitudinally adjustable in said frame and a guide plate, a rotary tool and one section of a spring supported work table mounted on said carriage, of one or more rotary tools mounted in said frame, said tools being adapted to rotate in the same direction as the feed roller, rotary feed rolls mounted on a shaft above the yielding tables, one being capable of longitudinal adjustment on its shaft to correspond with the adjustment of the feed table on said carriage and both feed rolls being capable of vertical adjustment to suit the thickness of the work and means for operating these several parts, substantially as and for the purposes set forth.

In testimony whereof I affix my signature in presence of two witnesses.

HARRISON W. HUTCHINS.

Witnesses:
ELGIN C. VERRILL,
GEO. LE BOURDAIS.